(12) United States Patent
Poer et al.

(10) Patent No.: US 8,479,116 B2
(45) Date of Patent: Jul. 2, 2013

(54) USER INTERFACE FOR ENGINEERED SYSTEMS ASSET ANALYSIS

(75) Inventors: Thomas K. Poer, Overland Park, KS (US); Glen A. Herman, Olathe, KS (US); David Stukesbary, Kansas City, MO (US); Karl K. Beal, Kansas City, MO (US)

(73) Assignee: HNTB Holdings Ltd, Kansas City, MO (US)

( * ) Notice: Subject to any disclaimer, the term of this patent is extended or adjusted under 35 U.S.C. 154(b) by 1248 days.

(21) Appl. No.: 12/082,516

(22) Filed: Apr. 11, 2008

(65) Prior Publication Data

US 2008/0255902 A1 Oct. 16, 2008

Related U.S. Application Data

(60) Provisional application No. 60/911,831, filed on Apr. 13, 2007.

(51) Int. Cl.
*G06F 3/048* (2006.01)

(52) U.S. Cl.
USPC .................. 715/786; 715/781; 715/785

(58) Field of Classification Search
CPC ................... G06F 3/04815; G06Q 10/06
USPC ............................. 715/781, 851, 782
See application file for complete search history.

(56) References Cited

U.S. PATENT DOCUMENTS

| | | | | |
|---|---|---|---|---|
| 5,623,588 A * | 4/1997 | Gould | | 715/787 |
| 5,835,692 A * | 11/1998 | Cragun et al. | | 345/419 |
| 6,167,394 A * | 12/2000 | Leung et al. | | 1/1 |
| 6,523,024 B1 * | 2/2003 | Yajima et al. | | 1/1 |
| 6,628,308 B1 * | 9/2003 | Greenberg et al. | | 715/764 |
| 6,801,814 B1 * | 10/2004 | Wilson et al. | | 700/90 |
| 7,134,088 B2 * | 11/2006 | Larsen | | 715/765 |
| 7,134,093 B2 * | 11/2006 | Etgen et al. | | 715/786 |
| 7,827,120 B1 * | 11/2010 | Evans et al. | | 705/344 |
| 7,925,982 B2 * | 4/2011 | Parker et al. | | 715/748 |
| 8,255,262 B2 * | 8/2012 | Siegel et al. | | 705/7.28 |
| 2002/0035408 A1 | 3/2002 | Smith | | |
| 2002/0154173 A1 * | 10/2002 | Etgen et al. | | 345/833 |
| 2003/0038797 A1 * | 2/2003 | Vazzana | | 345/419 |
| 2003/0195877 A1 | 10/2003 | Ford et al. | | |
| 2004/0075697 A1 * | 4/2004 | Maudlin | | 345/848 |
| 2005/0034074 A1 * | 2/2005 | Munson et al. | | 715/712 |
| 2005/0086096 A1 | 4/2005 | Bryant | | |
| 2006/0004923 A1 * | 1/2006 | Cohen et al. | | 709/228 |
| 2006/0167728 A1 * | 7/2006 | Siegel et al. | | 705/7 |
| 2007/0024468 A1 * | 2/2007 | Quandel et al. | | 340/968 |
| 2007/0282534 A1 * | 12/2007 | Herman et al. | | 702/5 |

OTHER PUBLICATIONS

International Search Report, mailed Jun. 11, 2008 (in U.S. Appl. No. 12/082,516, filed Apr. 11, 2008).

* cited by examiner

*Primary Examiner* — Steven B. Theriault
*Assistant Examiner* — Amy M Levy
(74) *Attorney, Agent, or Firm* — Shook, Hardy & Bacon L.L.P.

(57) ABSTRACT

Systems, methods, and computer-storage media of the present invention facilitate the management of assets of an engineered system. These management activities enable a user to understand various conditions surrounding identified system assets and provide tools for guiding decision making in terms of how prioritize projects for such assets. A user interface is also provided to display geospatially associated information relating to a selected portion of a system asset.

5 Claims, 9 Drawing Sheets

USER INTERFACE FOR ENGINEERED SYSTEMS ASSET ANALYSIS

CROSS-REFERENCE TO RELATED APPLICATIONS

This application claims the benefit of U.S. Provisional Application No. 60/911,831, filed Apr. 13, 2007, which is incorporated herein in its entirety.

BACKGROUND

Certain types of engineered systems are constantly in need of monitoring/assessment for current structural conditions, and based on such assessments, potentially face either repair, reinforcement or replacement. Examples of such engineered systems include networks of levees, bridges, roads, pipelines/water distribution systems, and other structural fortifications. Not surprisingly, engineers face many challenges in managing the "upkeep" of assets (components) of these systems. For instance, conducting monitoring or assessment activities for structural engineered systems is often labor intensive, and difficulties arise in storing and classifying the information gathered through assessments in an organized way so that it remains useful in the future. In fact, the large volume of monitoring/assessment data about a given engineered system—along with physical plan or feature data—can be overwhelming to an engineer attempting to determine what particular system assets are most in need of repair, reinforcement or replacement. Budgetary concerns and other political or social issues may also complicate the analysis in determining how to prioritize which system assets are most in need of current attention.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to systems, methods, and computer-storage media for managing the assets of an engineered system. These management activities enable a user to understand various conditions surrounding identified system assets and provide tools for guiding decision making in terms of how prioritize projects for such assets.

Accordingly, in one aspect, an embodiment of the present invention is directed to one or more computer-storage media comprising computer-useable instructions for performing a method of managing assets of an engineered system in order to determine how to prioritize the needs of such assets. According to the method, assets of an engineered system are identified and an assessment of various conditions of the assets is performed. The method also includes conducting a risk analysis for the assets based on the results of the condition assessment and additional preestablished factors. Based on at least the risk analysis, the method further includes applying a prioritization/ranking scheme in "ordering" the assets, i.e., to indicate which particular assets are a higher priority for needing repair, reinforcement or replacement.

In another aspect, an embodiment of the present invention is directed to one or more computer-storage media comprising computer-useable instructions for performing a method of managing assets of an engineered system in order to determine how to prioritize the needs of such assets. According to the method, assets of an engineered system are identified and an assessment of various conditions of the assets is performed. The method also includes conducting a risk analysis for the assets based on the results of the condition assessment and additional preestablished factors, as well as a cost analysis relating to the assets and objects which the engineered system are designed to protect. Based on least the risk analysis and the cost analysis, the method further includes applying a prioritization/ranking scheme to indicate which particular assets are a higher priority for needing repair, reinforcement or replacement.

BRIEF DESCRIPTION OF THE DRAWINGS

The present invention is described in detail below with reference to the attached drawings figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide, among other things, a method for managing assets of an engineered system where a vast quantity of data relating to the assets (e.g., condition data, survey data, etc.) is utilized along with analysis tools to present the user with options to guide decision making relating to selecting maintenance projects for such assets. Specifically, in one aspect, a prioritization/ranking scheme is implemented whereby certain assets are suggested to be of a higher priority for "upkeep" or maintenance related activities. In another aspect, the prioritization/ranking scheme focuses on particular maintenance related activities for a given system assets (e.g., repair vs. replacement, and various methods thereof). Embodiments also include a user interface with one or more display regions for presenting various condition data and analysis outcomes regarding certain surveyed or plan segments of the assets of the engineered system. In particular, certain embodiments leverage geographic location referenced data, or "geospatial" data, (e.g., Geographic Information System (GIS) data), such as integrated sensor and condition assessment data, to provide a visual landscape of relevant information surrounding the system assets.

It should be understood that the term "engineered system" as used herein is a broad term referring to a wide range of structural systems, including but not limited to, networks of levees, bridges, roadways, pipelines/water distribution systems, channels, utilities, and other structural fortifications, or portions thereof, (including in particular, horizontally stationed systems) that are maintained by people. Engineered systems are not limited to systems built according to modern civil engineering standards, but also includes older systems that are now surveyed and maintained to determine their structural condition and needs for maintenance. Additionally, the term "maintenance", "maintenance project" or "maintenance activity" is meant to connote any type of engineer guided structural work conducted on an asset of an engineered system, including repair, reinforcement or replacement work. All of these terms should be construed broadly and liberally consistent with embodiments of the present invention discussed herein.

Exemplary Operating Environment

Figure 1:
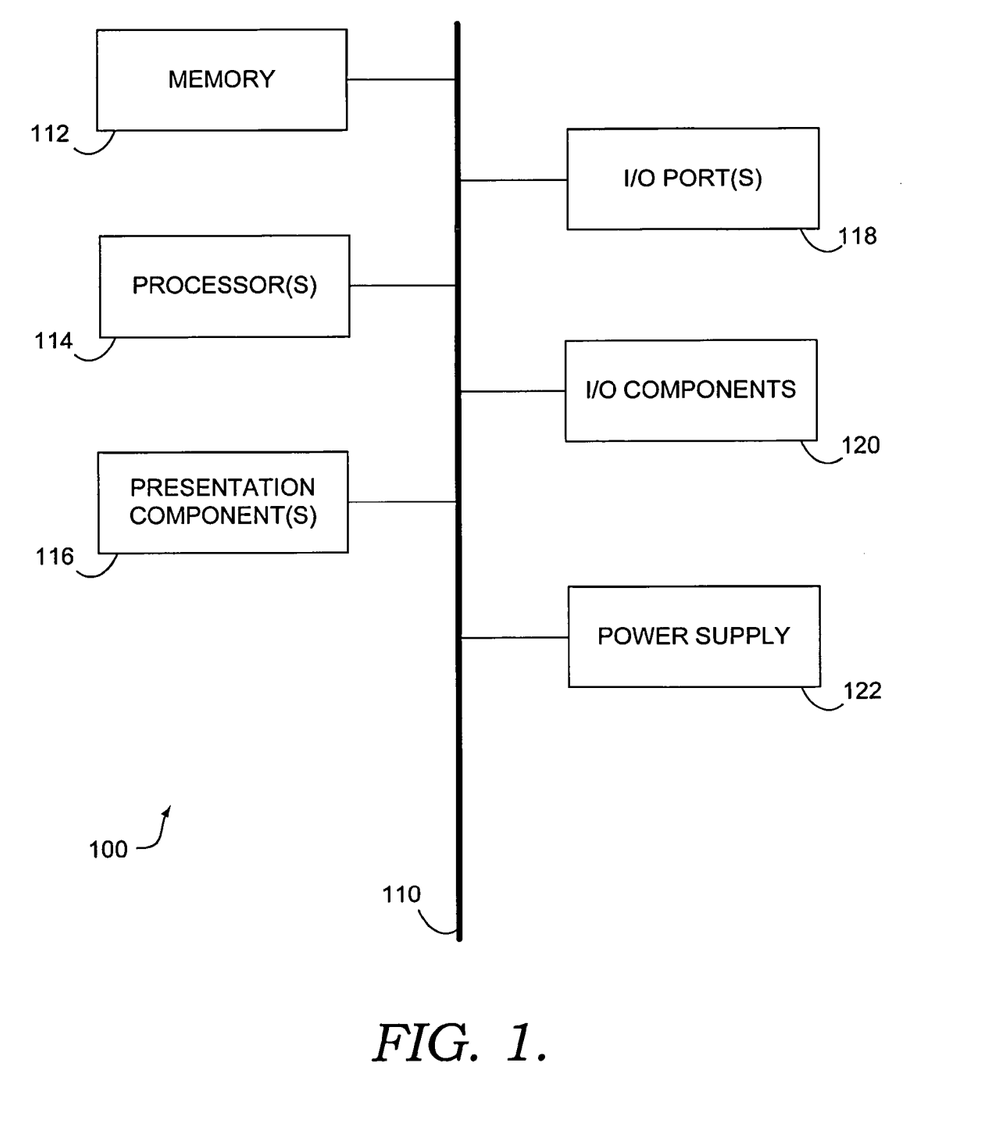
FIG. 1 is a block diagram of an exemplary computing environment suitable for use in implementing the present invention.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, cellular, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Overall System Asset Management Engine

Figure 2:
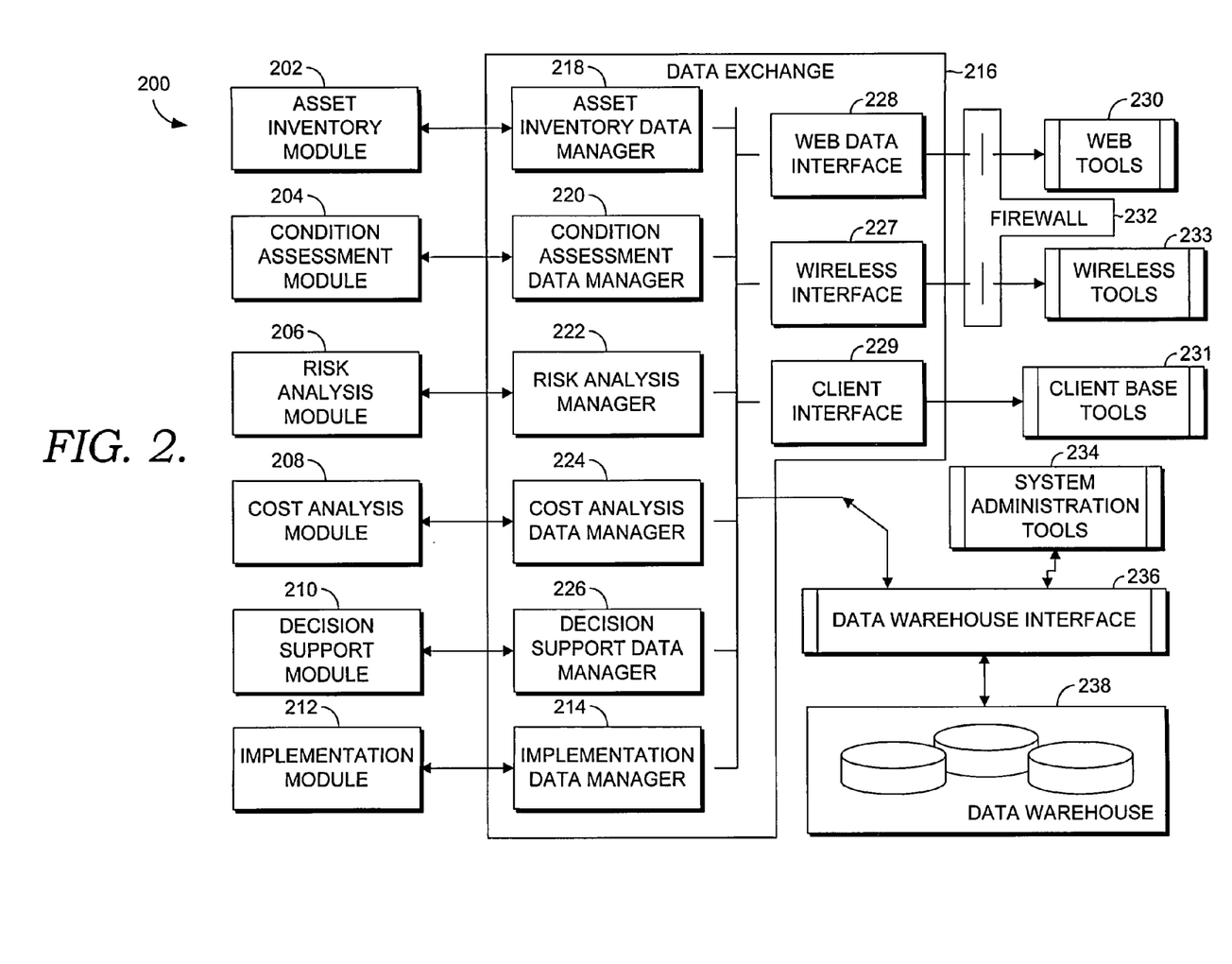
FIG. 2 is a diagram showing hierarchical relationships among elements of a system asset management engine in accordance with an embodiment of the present invention.

Referring now to FIG. 2, a block diagram is shown of an exemplary system asset management engine 200 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The engine 200 illustrates an overall architecture for managing system assets in accordance with one embodiment of the present invention. As shown in FIG. 2, the engine 200 includes a data warehouse 238 for storing comprehensive data related to assets of an engineered system. The data may include, for instance, survey information, sensor readings, condition assessment information, as well as data resulting from various analysis performed in providing the user with decision making guidance surrounding the system assets. The data warehouse 238 may be centrally located and accessible to multiple users using customized user interfaces.

A variety of different types of users may contribute data to and consume data from the data warehouse 238 for a given project. These users may include, for instance, owners, planners, administrators, public officials, engineers, surveyors, draftspersons, contractors, and the public. In an embodiment, each user would be able to view, edit or provide system administration of data from the data warehouse based on privileges assigned to each user. For example, system administration tools 234 may be provided for defining security settings and user information, such as usernames and passwords that may be associated with user profiles. The user profiles define each user's access to the data warehouse 238 and the various data pieces, modules and data managers depicted in FIG. 2. In addition, the user profiles may define each user's ability to enter and modify data. The system administration tools 234 allow administrators to define and modify those security settings and user privileges.

A data warehouse interface 236 is provided for accessing data from and providing data to the data warehouse 238. The data warehouse interface 236 is in communication with data exchange components 216, which operate to push and pull data to and from the data warehouse 238 via the data warehouse interface 236. The data exchange components 216 may communicate with other components of the information model system 200 to coordinate access to appropriate data pieces stored by the data warehouse 238, as well as receiving data from these other components and communicating the data to the data warehouse 238 for storage. As shown in FIG. 2, the data exchange components 216 include an asset inventory data manager 218 for interfacing with an asset inventory module 202, a condition assessment data manager 220 for interfacing with a condition assessment module 204, a risk analysis data manager 222 for interfacing with a risk analysis module 206, a cost analysis data manager 224 for interfacing with a cost analysis module 208, a decision support data manager 226 for interfacing with a decision support module 210, and an implementation data manager 214 for interfacing with an implementation module 212. Each of the modules 202, 204, 206, 208, 210 and 212 provides a user interface with a geospatial display of relevant data that may be navigated by the user. Further, as explained in further detail below, certain modules 202, 204, 206, 208, 210 and 212 also perform an analysis of relevant data in order to provide on the user interface information useful to establish a hierarchy of system assets that have maintenance needs. Although not shown, other sources of data may be provided by system asset management engine 200 in various embodiments of the present invention.

Interaction and display of data through the data exchange 216 is attained through three portals. These portals include a wireless data interface 227, web data interface 228 and the client base interface 229. The client base interface 229, including a desktop or local area network, facilitates interfacing with a variety of client based tools 231 for viewing and interaction. The web data interface 228 is further provided to facilitate interacting with a variety of web tools 230. The wireless data interface 227 is further provided to facilitate interacting with a variety of wireless tools 233. The web tools 230, client base tools 231, and wireless tools 233, allow users to access and view different pieces of data from the data warehouse 238 (e.g., within user interfaces generated by modules 202, 204, 206, 208, 210 and 212) from remote locations over a network, such as the Internet. A secure login may be required for users to access data in the data warehouse 238, which may be located behind a firewall 232 for security purposes.

Figure 3:
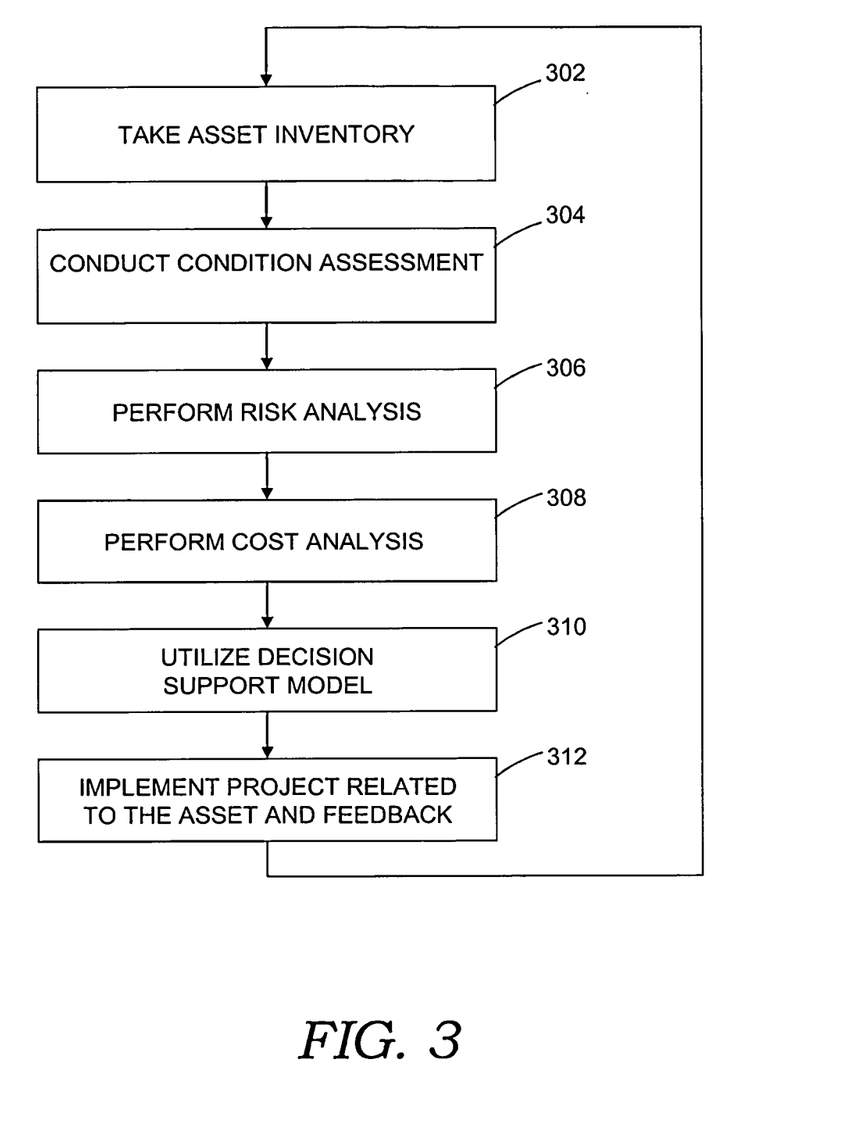
FIG. 3 is a flow diagram showing a depiction of an overall process lifecycle for managing the assets of an engineered system in accordance with an embodiment of the present invention.

Referring now to FIG. 3, a method related to an overall process lifecycle for managing the assets of an engineered system is represented by a flow diagram. Initially, an inventory of assets of an engineered system is taken, as shown at block 302. The inventory may include both an identification of components of the assets as well as integrating information surrounding the operation or function of such components of the assets. By way of example, if the engineered system is a series of levees along a waterway, the components associated with those levee assets may include engineering surveys, "as builts" or civil engineering plans for constructing a segment of a levee or other component (e.g., a sluice gate), various sensors or other observational equipment, and operational characteristics thereof (e.g., rain gauge, field GPS, pump station sensor, video cameras, piezometers, load cells, etc.), aerial or topographic maps, etc. Specifically, these components may be related to one another in the data warehouse 238 under the direction of the an asset inventory data manager 218 for geospatial association.

An assessment of the conditions of, or surrounding, the assets of the engineered system is conducted at block 304. For instance, this step may include an engineering field assessment of the assets (physical inspections, sensor examination, etc.) as well as an analysis of information gathered in the field assessment and/or through the asset inventory that has taken place. As one example, using a combination of a physical inspection for structural defects along with data from subterranean sensors position within or beneath a levee, an analysis may be performed to determine a geotechnical stability rating for a segment of a levee. The results of the condition assessment may be presented to the user geospatially on a user interface by the condition assessment module 204, as explained in further detail below.

Through information gathered in the inventory of system assets, along with the condition assessment, a risk analysis is performed, as represented by block 306. The risk analysis also takes into account certain parameters and information models to generate various risk output profiles. By way of example, in a levee system, elevational maps are utilized in conjunction with hazard models (e.g., for flooding conditions created by a storm surge or a rain event) and condition assessment information to gauge the probability of failure of a levee segment and the consequences to items behind the levee (e.g., structures flooded, important transportation routes affected). The risk analysis may take into account certain variables, such as a range of water surface elevations due to different flooding scenarios, in order to generate different risk output profiles. Additionally, a risk level may be plotted graphically versus a probability of structural failure of an asset for certain hazard scenarios. This plotting may indicate to the user situations where an asset needs the most attention (e.g., severe consequences to surrounding items to the assets upon failure combined with a high probability of asset failure). Refinement of risk output profiles may also be accomplished by utilizing information from previous hazard events to improve information models.

As shown at block 308, a cost analysis relating to the systems assets and items which the engineered system is designed to protect is also performed. The analysis includes an evaluation of the costs involved to implement, improve or replace the assets (or portions thereof) as well as the costs of damage to affected structures or persons if a particular risk output profile were to result. For instance, in the case of a levee, an evaluation is conducted to determine the cost of levee repair or replacement, and the cost to repair structures impacted by levee failure in different flooding scenarios (e.g., at different water surface elevation levels). Additionally, the "cost" may include a human cost factor, such as residences or schools affected, emergency evacuation routes blocked, jobs lost due to business disruptions, etc.

Taking into account the results of the analysis performed in steps 306 and 308, a decision support model is utilized, as represented by block 310. More specifically, a prioritization/ranking scheme provides "ordering" of the system assets, suggesting which particular portions of the system assets are a higher priority for needing "upkeep" related activities, as well as what particular repair, reinforcement or replacement steps are suggested. By way of example, various parameters may be weighted against one another in order to come up a project ranking. Projects may be ranked in terms of maintenance of one asset (or portion thereof) against another asset (or another portion of the same asset), as well as by one type of repair or replacement method versus another type of repair or replacement method for the particular asset. For instance, in the case of a levee segment, the effectiveness of adding relief wells versus replacing the entire levee segment can be compared and ranked. A non-exhaustive list of weighing factors may include public or private funding, stakeholder support, lives protected by avoiding asset structural failure, general safety concerns, ability of the asset to function based on its current condition assessment, cost effectiveness of certain maintenance methods (e.g., repair, reinforcement or replacement), and environmental impact, among other factors.

As represented by block 312, an implementation of a project related to the selected asset or portion thereof (e.g., repair, reinforcement or replacement activities) is undertaken. The implementation module 212 provides a visual representation (e.g., an engineered computer-generated design) for the asset, with the implementation data manager 214 managing the plans and specifications for the particular asset "upkeep" scenario selected. These stored plans and specifications and other data regarding the asset being maintained may then act as feedback for utilization in future process lifecycles for managing the particular system asset.

Figure 4:
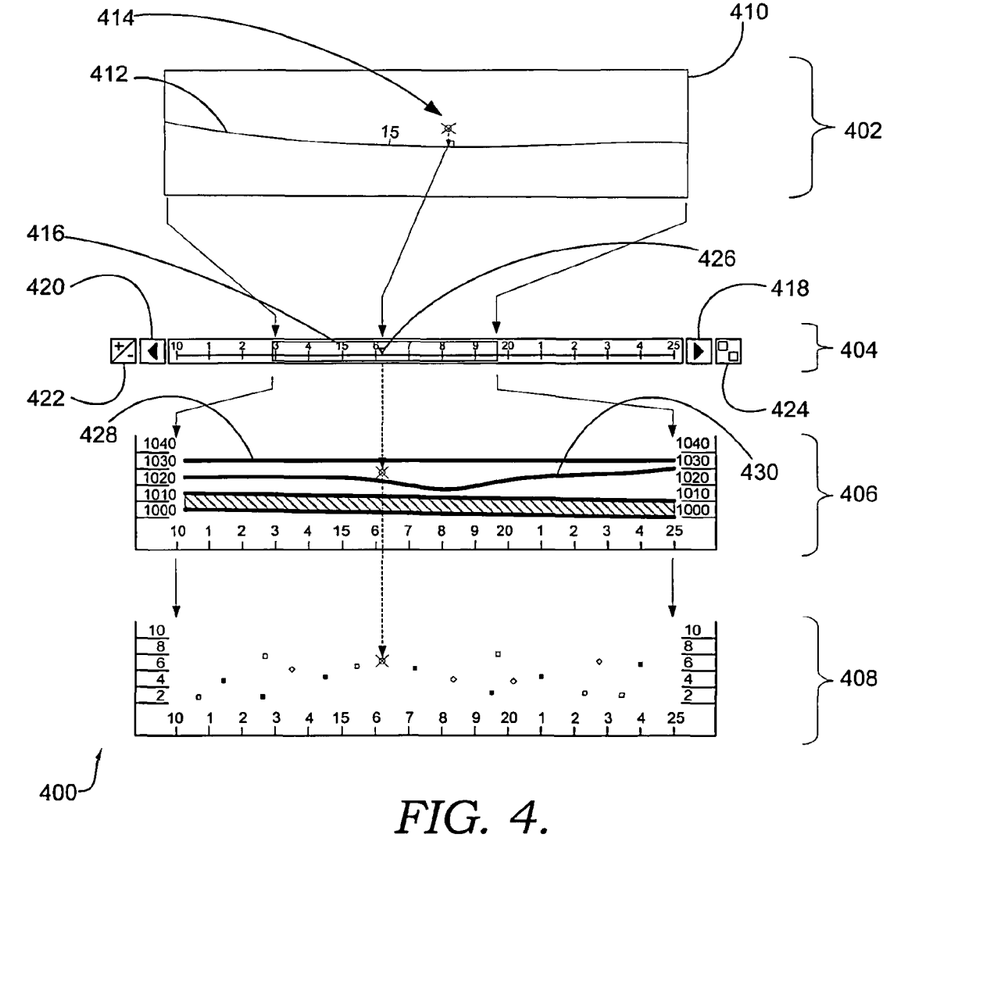
FIG. 4 is a diagrammatic view of a template for presenting geospatially associated information relating to a selected portion of a system asset in accordance with an embodiment of the present invention.

As previously mentioned, various embodiments of a user interface are provided for navigating through a surveyed asset of an engineered system. With reference to FIG. 4, an exemplary user interface 400 includes various associated views presenting certain types of geospatially associated information relating to a selected portion of a system asset. Although not limited to a specific type of engineered system, the exemplary user interface 400 of FIG. 4 is particularly well suited for presenting information regarding levee assets. In broad terms, the user interface 400 includes a plan view display region 402, a navigator control display region 404, a profile view display region 406 and a graph view display region 408. Throughout the description of the remaining figures (FIGS. 4-9), the terms "levee" and "asset" may be used interchangeably in illustrating certain concepts of the embodiments of the present invention.

Within the plan view display region 402 of the user interface 400, a certain bounded portion 410 indicates a segment of a selected levee. The bounded portion 410 is associated with a stationed reference line 412 (e.g., a levee center line or other surveyed line associated with and in proximity to a levee or set of levees along a waterway). A given component or feature 414 associated with the levee (e.g., a sensor, a levee crossing, a pump station, etc.) is projected normally onto the reference line 412 for geospatial location of the feature 414 in various viewing perspectives of the portion of the levee represented in the bounded portion 404. The bounded portion 410 may take the form of a schematic figure of the system asset, an aerial photograph of the asset, or other representation.

The navigator control display region 404, or "Locator" region, situated below the plan view display region 402, acts as a master controller designating the size of the bounded portion 410 as well as the total size of the viewable area for each of the display regions 402, 406 and 408 along a theoretically straightline version of the scaled stationed reference line 412. Located within the display region 404 is a locator bar 416 moveable linearly along a horizontal axis representative of the stationed reference line 412. The numerical range of the axis corresponds with an established range of survey stations. Likewise, the size of the locator bar 416 in the horizontal direction corresponds with the size of the bounded portion 410 along the stationed reference line 412. The navigator control display region 404 further includes corresponding upstation and downstation selector arrows 418 and 420 to change the particular range of survey stations viewed along the stationed reference line 412. A zoom in/out selector 422 controls the horizontal width of the locator bar 416 and thus the size of the bounded portion 410 in terms of the number of survey stations captured within the bounded portion 410. Additionally, a filtering selector 424 enables the switching between different stationed reference lines 412 of a levee or group of levees of an engineered system. Further, a point marker 426 within the locator bar 416 denotes the exact normalized location of the levee feature 414 (or any additional features) designated in the overview display region 402.

A normal view of the plan view display region 402 is represented by the profile view display region 406. The display region 406 includes a horizontal axis representative of the scaled stationed reference line 412 as well as a vertical axis showing elevation values for the particular segment of the levee displayed. Within the display region 406 the ability to plot feature lines 428 and 430 as a function of the stationed reference line of the selected levee section is supported. Merely as examples, the first feature line 428 represents the top of the levee elevation and a second feature line 430 represents the elevation of the land on the backside (dry side) of the levee. Multiple profile views may be developed, docked, and displayed with varying data.

The graph view display region 408 includes a horizontal axis representative of the scaled stationed reference line 412 as well as a vertical axis showing a particular attribute data scale. Certain attributes are derived from particular process steps undertaken in overall process lifecycle represented by the flow diagram of FIG. 4. Merely as examples, the attributes may be related to condition ratings, risk probabilities, cost analysis, prioritization rankings, etc, and may be associated with features 414 designated in the plan view display region 402. Multiple graph views may be developed, docked, and displayed with varying data.

Turning now to FIGS. 5-8, each of these figures depicts an exemplary user interface for assisting in the management of assets of an engineered system. Some portions of FIGS. 5-8 utilize various principles established by the previously described exemplary user interface 400, as explained in further detail herein.

Figure 5:
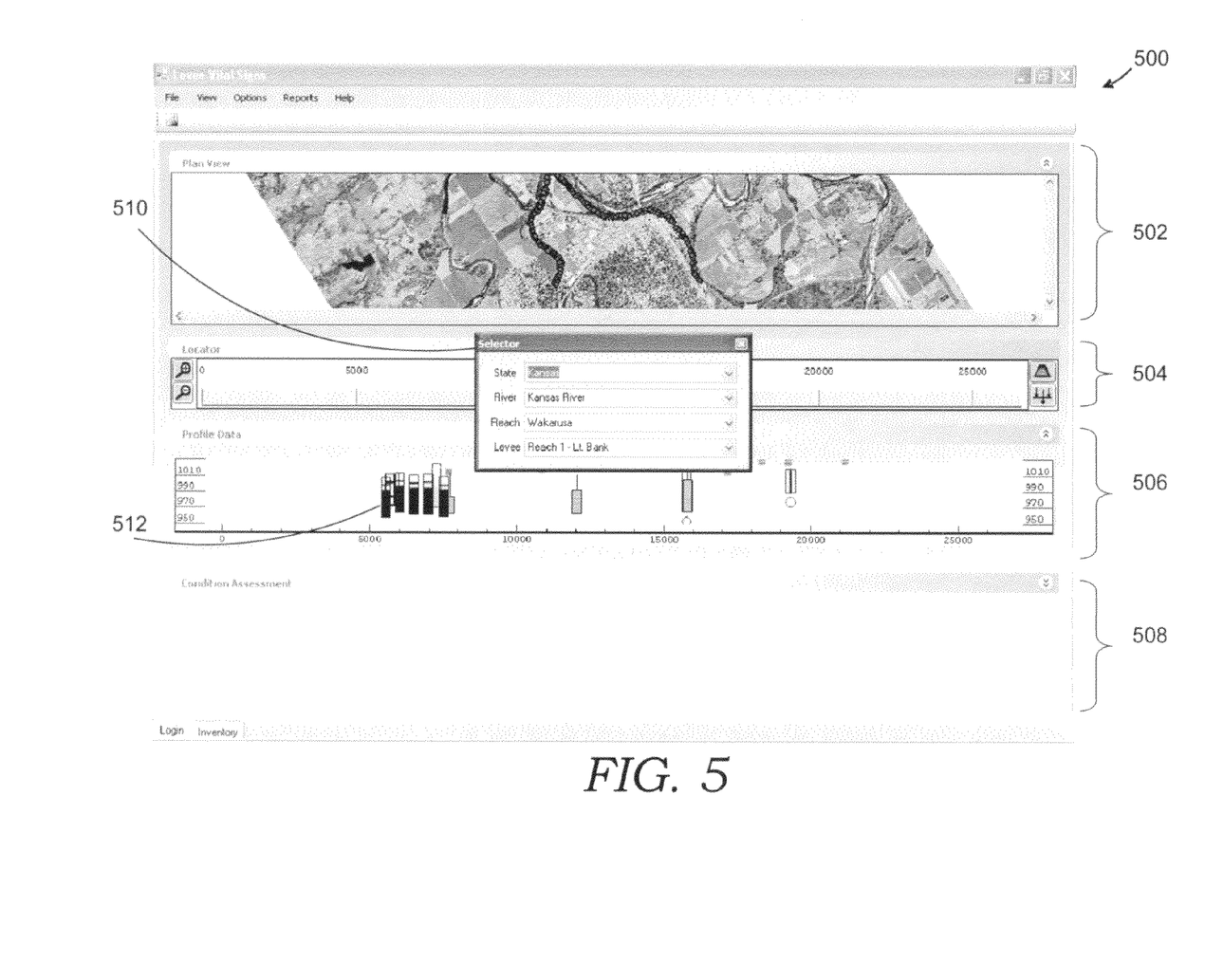
FIG. 5 is an illustrative screen display of an exemplary user interface configured to display geospatially associated information relating to a selected portion of a system asset with a selector overlay box, in accordance with an embodiment of the present invention.

With reference to FIG. 5, user interface 500 includes a plan view display region 502, a navigator control display region 504, a profile view display region 506, and a collapsed graph view display region 508, and a selector overlay box 510. In the particular exemplary user interface 500, an aerial view of a river basin and levee system is shown in the plan view display region 502 along with geospatially located asset features overlying the aerial view. Within the profile view display region 506, certain asset features and their current conditions are represented by vertical bars 512 or other symbology. For instance, a particular bar 512 may have various shading or line effects to indicate, as examples, the current, flood, and overtopping stages at a river gage station, or the current force load and critical load ratings for a load cell, with the river gage station and load cell (or other levee sensors or features) geospatially located within the profile view display region 506. Typically, only particular asset features that can convey condition data within a vertical bar 512 are displayed in the display region 506. The selector overlay box 510 enables the user to select a particular geographic region where an engineered system, such as a levee, is located. Upon making the selection, display regions 502, 504, 506 and 508 are populated with relevant data for the particular engineered system (e.g. levee) within the geographic area. Additionally, each of the display regions 502, 504, 506 and 508 may have a minimize/maximize selector 514 to either display or remove data from being presented in the corresponding display region. For instance, in the exemplary user interface 500, the graph view display region 608 is shown unpopulated with data.

Figure 6:
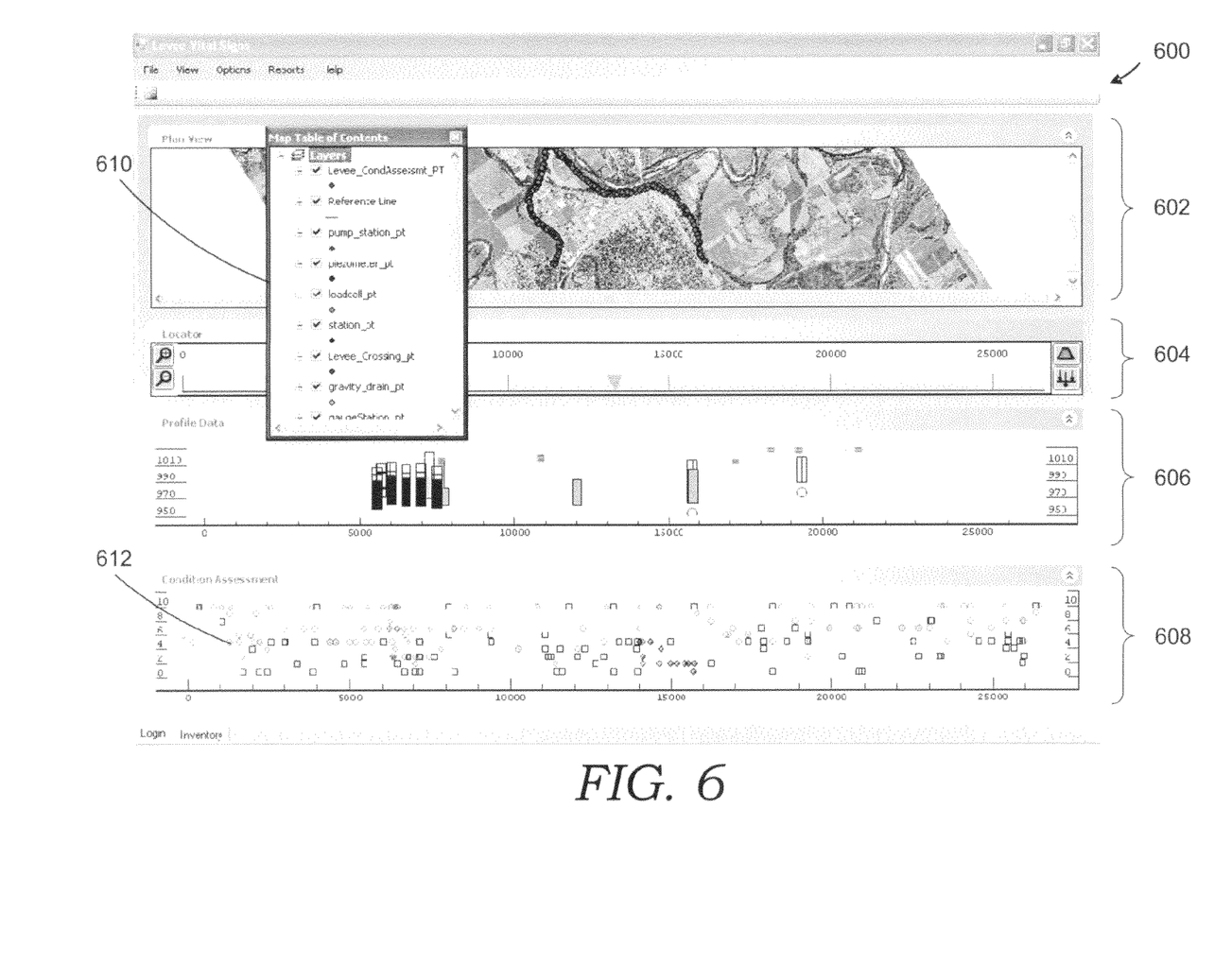
FIG. 6 is an illustrative screen display of an exemplary user interface configured to display geospatially associated information relating to a selected portion of a system asset with a table of contents overlay box, in accordance with an embodiment of the present invention.

Similar to FIG. 5, user interface 600 depicted in FIG. 6 includes a includes a plan view display region 602, a navigator control display region 604, a profile view display region 606 and a graph view display region 608. Additionally, a table of contents overlay box 610 enables available asset features to be selected or deselected for geospatial location within display regions 602, 606 and 608. Typically, certain symbology is adopted to provide each type of asset feature (e.g., pump station, piezometer, load cell, etc.) with a distinct visual appearance to enable the user quickly distinguish between the asset features being displayed. In the exemplary user interface 600, a condition assessment value is plotted for relevant asset features in the graph view display region 608. In one arrangement, each of the asset feature symbols 612 is selectable (e.g., via a mouse click) for viewing in a pop-up box the underlying metadata supporting the particular value to which the symbol 612 is plotted. For instance, particular sensor readings, engineering analysis formulae or algorithms, or other data that impact the plotted condition assessment value may be displayed in the pop-up box.

Figure 7:
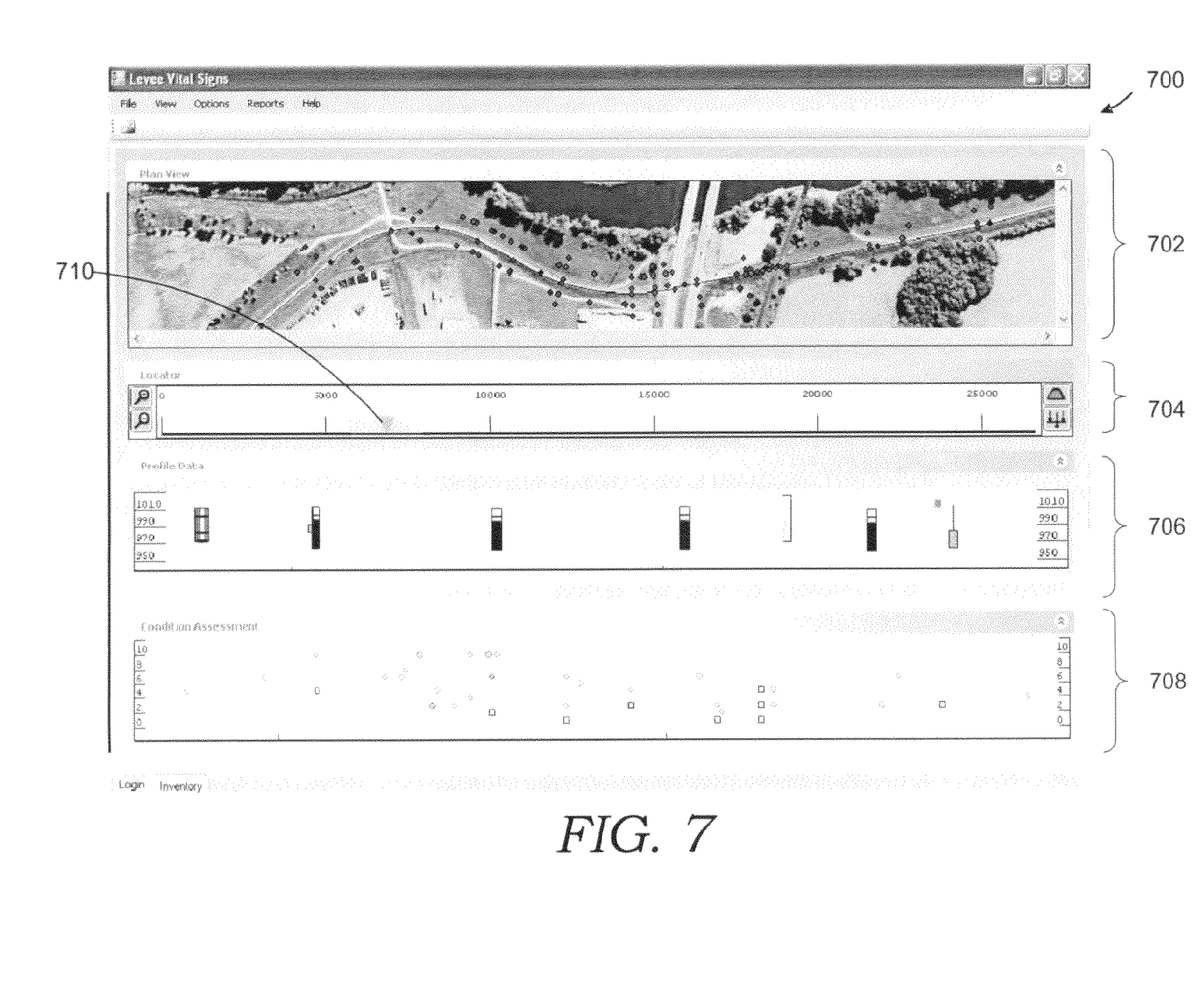
FIG. 7 is an illustrative screen display of an exemplary user interface configured to display geospatially associated information relating to a selected portion of a system asset and presenting a zoomed in view, in accordance with an embodiment of the present invention.

Another user interface 700 is provided in FIG. 7 to show a "zoomed in" version of the display regions 602, 606 and 608 of user interface 600 FIG. 6 using a locator bar. Specifically, user interface 700 includes a plan view display region 702, a navigator control display region 704, a profile view display region 706 and a graph view display region 708. A locator bar 710 within display region 704 spans a horizontal distance along a stationed reference line that sets the geographic bounded limits for the content provided in the display regions 702, 706 and 708. Accordingly, only the levee features geospatially located within (or normal to) the range of surveyed stations spanned by the locator bar 710 in the navigator control display region 704 are represented in display regions 702, 706 and 708.

Figure 8:
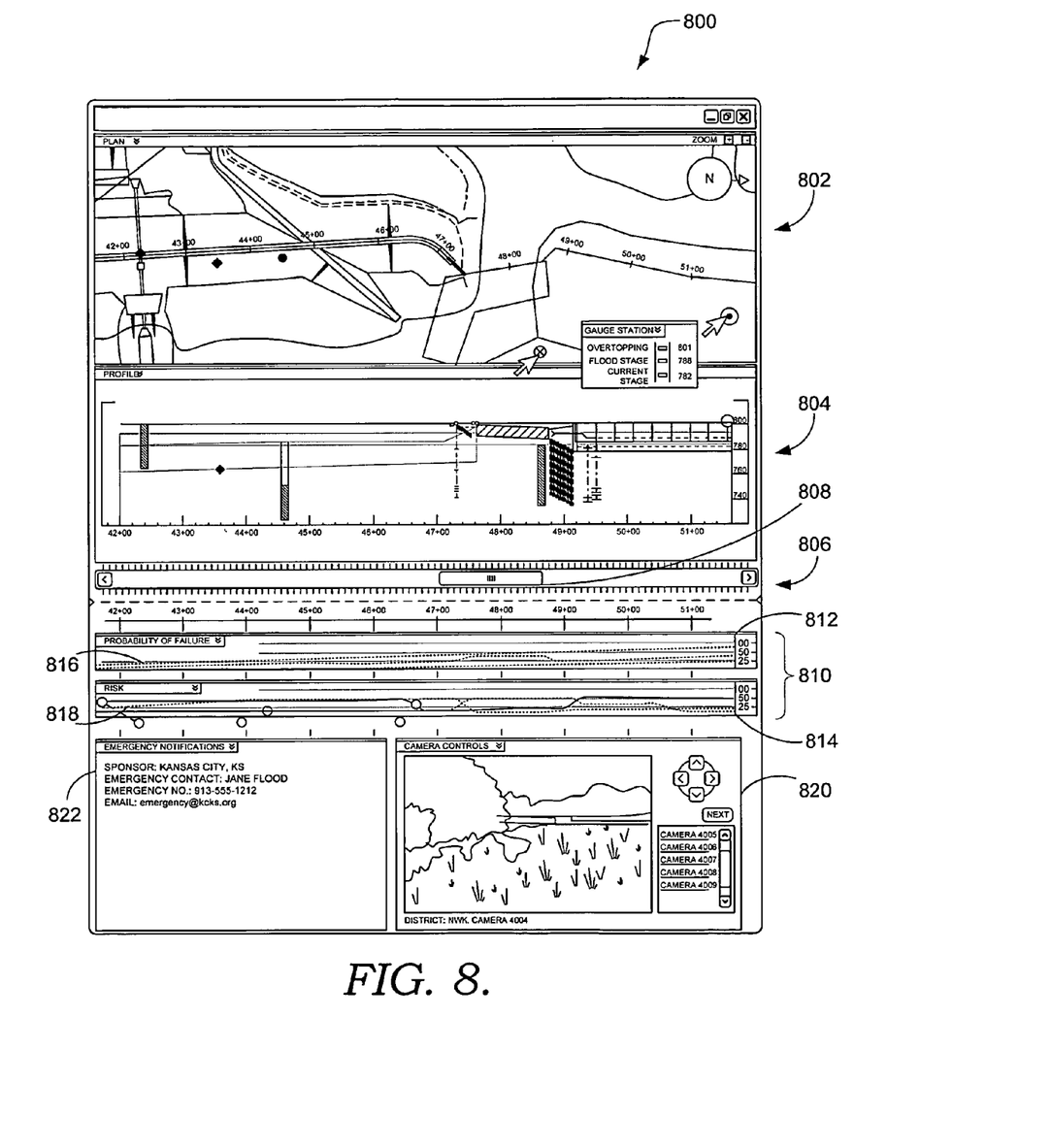
FIG. 8 is an illustrative screen display of an exemplary user interface configured to display geospatially associated information relating to a selected portion of a system asset with a graph view display region presenting a probability of failure plotting and a risk analysis plotting, in accordance with an embodiment of the present invention.

With reference to FIG. 8, a user interface 800 includes a plan view display region 802, a profile view display region 804, a navigator control display region 806 with a locator bar 808 and a graph view display region 810. The display region 810 includes a probability of failure plotting 812 and a risk analysis plotting 814. Specifically, the probability of failure plotting 812 includes various plot lines 816 each corresponding to a particular hazard event (e.g., a hurricane versus a standard heavy rain event) or severity scenario (different water surface elevations or storm categories) to indicate levee failure probabilities along the selected portion of the stationed reference line. The risk analysis plotting 814 includes plot lines 818 corresponding to particular types of risk leading to levee failure, such as scour risk, stability risk, underseepage risk, or other risks. A camera view 820 provides a visual overview of the levee via a particular camera located closest to the surveyed stations associated with the locator bar 808 location. An emergency notification module 822 provides relevant information for notifying key officials for flood fighting as risk increases. For instance, notifications can be sent to such officials (and others) based on defined parameters including water surface elevations, pore water pressures, level of risk, probability of failure, among other factors.

Figure 9:
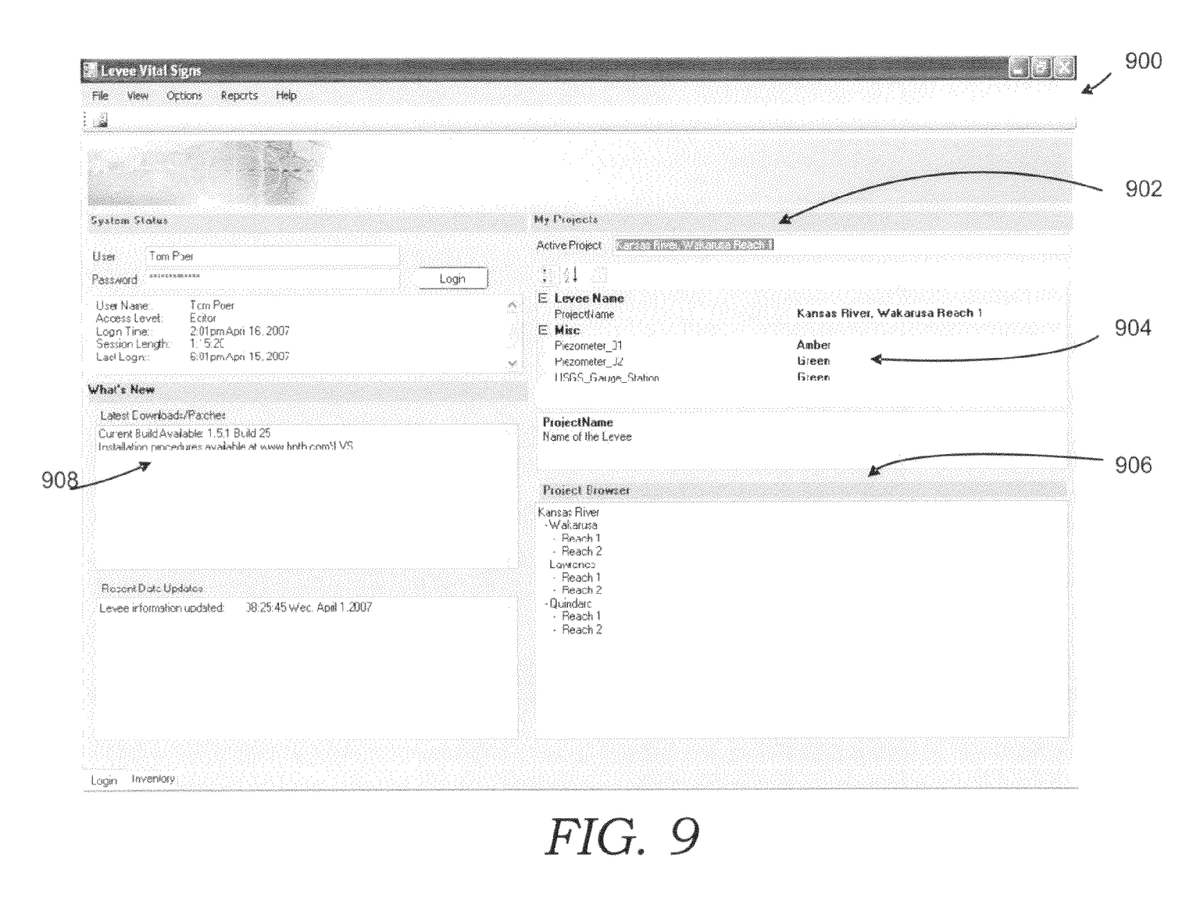
FIG. 9 is an illustrative screen display of an exemplary user interface configured to display an overview of project-related information for a particular user, in accordance with an embodiment of the present invention.

Turning to FIG. 9, a user interface 900 provides an overview of project-related information for a particular user. The user can select an active project 902 and establish certain "favorite" asset features to be displayed for the project selected. The active project 902 may display critical system assets or a portion of a system asset being maintained (e.g., a particular levee segment). Various alert information 904 for the asset features provide an overview of the latest conditions recorded. For instance, a "green" rating indicates that sensors readings are at acceptable levels, while an "amber" rating indicates that some concern exists and should be addressed. A project browser display region 906 lists the selection of projects for the particular user of the system asset management engine 200. The selected project would be analyzed and displayed as seen in FIGS. 3-9. Other types of information may also be provided within the user interface 900, including "as builts" 908 or other relevant asset-related information provided to the data warehouse 238 (e.g., sensor data uploads).

As can be understood, embodiments of the present invention provide method for managing the assets of an engineered system. These management activities enable a user to understand various conditions surrounding identified system assets and provide tools for guiding decision making in terms of how prioritize projects for such assets. Specifically, a user interface incorporates geospatial data to provide a visual "overview" of information about system assets (e.g., raw data and/or analysis results).

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more nontransitory computer-readable media having embodied thereon computer-usable instructions that, when executed, facilitate a method for managing assets of an engineered system, the method comprising:
   on a display device, displaying a plan view display region including a bounded portion providing a representation of a section of an asset of the engineered system, wherein the representation of the section includes a representation of a stationed reference line, wherein the stationed reference line is a surveyed line associated with the asset;
   on the display device, displaying a profile view display region corresponding to the representation of the section of the asset, wherein the profile view display region includes a profile view horizontal axis representative of the stationed reference line;
   on the display device, displaying a graph view display region conveying information regarding geospatially located features associated with the section of the on asset, wherein the graph view display region includes a graph view horizontal axis representative of the stationed reference line; and
   on the display device, displaying a navigator control display region including a navigator control horizontal axis representative of the stationed reference line, wherein a numerical range of the navigator control horizontal axis corresponds with a range of survey stations along the stationed reference line, wherein the navigator control display region designates a size of the bounded portion and a size of the viewable area for each of the plan view display region, the profile view display region, and the graph view display region along the stationed reference line, wherein the navigator control display region further includes a locator bar that is moveable linearly along the navigator control horizontal axis, wherein the locator bar spans a distance along the navigator control horizontal axis that sets geographic bounded limits for content that is associated with the asset and provided simultaneously with the plan view display region, the profile view display region, and the graph view display region, wherein moving the locator bar linearly along the navigator control horizontal axis changes a particular range of survey stations viewed along the stationed reference line, and wherein changing a horizontal width of the locator bar changes a number of survey stations captured within the bounded portion.

2. The media of claim 1, wherein the assets of the engineered system include one or more levees associated with at least one stationed reference line.

3. The media of claim 1, wherein the profile view display region includes information plotted against the profile view horizontal axis and an elevation axis.

4. The media of claim 1, wherein the information conveyed by the graph view display region includes condition assessment data.

5. The media of claim 1, wherein the information conveyed by the graph view display region includes at least one of probability of failure data and risk data.

* * * * *